United States Patent
Lee et al.

(10) Patent No.: US 7,774,121 B2
(45) Date of Patent: Aug. 10, 2010

(54) CURVE SPEED CONTROL SYSTEM WITH ADAPTIVE MAP PREVIEW TIME AND DRIVING MODE SELECTION

(75) Inventors: Yong H. Lee, Troy, MI (US); Weiwen Deng, Rochester Hills, MI (US); Haicen Zhang, Windsor (CA)

(73) Assignee: GM Global Technology Operations, Inc., Detroit, MI (US)

( * ) Notice: Subject to any disclaimer, the term of this patent is extended or adjusted under 35 U.S.C. 154(b) by 558 days.

(21) Appl. No.: 11/831,571

(22) Filed: Jul. 31, 2007

(65) Prior Publication Data

US 2009/0037062 A1    Feb. 5, 2009

(51) Int. Cl.
*B60T 8/32*    (2006.01)
*B60L 3/08*    (2006.01)

(52) U.S. Cl. ............................... 701/70; 701/93
(58) Field of Classification Search .................. 701/70, 701/93
See application file for complete search history.

(56) References Cited

U.S. PATENT DOCUMENTS

| | | | |
|---|---|---|---|
| 6,220,986 B1 | 4/2001 | Aruga et al. | |
| 6,343,253 B1 | 1/2002 | Matsuura et al. | |
| 6,424,904 B1 | 7/2002 | Takahashi et al. | |
| 2004/0111209 A1 | 6/2004 | Kagawa et al. | |
| 2006/0030992 A1* | 2/2006 | Iwatsuki et al. | 701/93 |
| 2006/0190158 A1* | 8/2006 | Shiiba et al. | 701/70 |
| 2006/0259233 A1* | 11/2006 | Chien et al. | 701/200 |
| 2007/0085850 A1* | 4/2007 | Hong et al. | 345/442 |
| 2007/0091094 A1* | 4/2007 | Hong et al. | 345/474 |
| 2007/0106442 A1* | 5/2007 | Lu | 701/38 |
| 2007/0168119 A1* | 7/2007 | Mori | 701/207 |
| 2008/0015755 A1* | 1/2008 | Kuwahara et al. | 701/48 |
| 2008/0059036 A1* | 3/2008 | Imai et al. | 701/93 |
| 2008/0312802 A1* | 12/2008 | Kaigawa et al. | 701/96 |

* cited by examiner

*Primary Examiner*—Thomas G Black
*Assistant Examiner*—Shelley Chen
(74) *Attorney, Agent, or Firm*—John A. Miller; Miller IP Group, PLC

(57) ABSTRACT

A system and method for detecting a road curve as a vehicle approaches the curve, automatically providing road curvature information and controlling vehicle speed. The system uses a locating device and a map database to know the vehicle's position. Depending on the speed of the vehicle, the system generates a curvature profile for different curvature data points at or around the curve in front of the vehicle. The system then generates a desired speed profile for the curvature points. The desired speed profile and the actual vehicle speed are compared to determine whether the vehicle is traveling too fast for the target speed at each profile point. The acceleration computation can be enhanced by providing a driver cornering mode input that the vehicle operator can select based on how aggressively the driver wants the system to act to slow down the vehicle.

21 Claims, 2 Drawing Sheets

CURVE SPEED CONTROL SYSTEM WITH ADAPTIVE MAP PREVIEW TIME AND DRIVING MODE SELECTION

BACKGROUND OF THE INVENTION

1. Field of the Invention

This invention relates generally to a system and method for detecting whether a vehicle is approaching a curve in the mad too fast, and if so, automatically providing braking control and, more particularly, to a system and method for determining whether a vehicle is approaching a curve in the mad too fast, and if so, automatically providing braking control, where the system and method adaptively determine when to provide curvature information of the curve based on vehicle speed and selectively provide driver aggressiveness control.

2. Discussion of the Related Art

Driving too fast on a road curve could cause not only discomfort for vehicle occupants, but also, under some circumstances, the loss of vehicle control. If a driver approaches a curve at too high of a speed, vehicle control prior to normal curve steering begins with a reduction in vehicle speed. The deceleration level required for a curve depends on many factors, such as the curvature of the road, the vehicle speed, the curve bank angle, the road gradient, the road surface coefficient of friction, vehicle characteristics, driver competence, etc. Usually, a driver relies on his or her visual information about the upcoming curve to determine the proper speed and braking level. Although there are generally warning signs for sharp curves, such as posted speed limits, drivers sometimes do not pay attention to these warning signs or follow the posted speed limit. The timing of the brake application relative to the vehicle's position on a curve is also important in that it is generally necessary to slow down enough before the vehicle reaches the curve. Failure to perform a proper maneuver may result in not only repeated adjustments of the brake and steering, but also, possibly serious accidents by crossing the lane boundary or going off the road.

Certain active safety techniques have been developed in the art that may assist drivers in maintaining vehicle control during cornering. The conventional implementations of the active safety approaches have been anti-lock braking and traction control systems to help drivers corner safely by sensing road conditions and intervening in the driver's brake and throttle control selections. However, drivers may be helped further by complimenting such control systems with strategies that intervene in vehicle control prior to entering a curve.

Through study and simulation, a smaller curve radius has been shown to require a larger steering input and steering error increases linearly with required steering wheel angle. Drivers compensate for this by choosing a slower speed, such that the time to line crossing to the inner boundary is constant over all curve radius. Thus, the safety margin to the inner lane boundaries are maintained.

One known system for determining whether a vehicle is approaching a curve too fast, and if so, automatically providing vehicle braking, is described in U.S. patent application Ser. No. 11/297,906, titled Speed Control Method for Vehicle Approaching and Traveling on a Curve, filed Dec. 9, 2005, assigned to the assignee of this application and herein incorporated by reference. This system uses GPS signals, a map database, vehicle speed, vehicle yaw rate and steering angle to provide a profile of the proper speed for a vehicle traveling around a curve at different distances from the vehicle.

This system has limitations in that the system is calibrated to provide road curvature information at a predetermined distance of the curve, such as 250 meters. As a result, the resolution of the curve data is limited because there are fixed steps between the data points, and the number of map points will be limited due to computation and communication time. Therefore, if a vehicle is traveling slowly, the curvature information provided at the fixed step increments a predetermined distance from the curve may not be necessary, and thus the resolution of the system may be limited. Further, if the vehicle is traveling at a high speed, the fixed distance from the curve to provide the curvature information may be too close to the curve to ensure a smooth deceleration before reaching the curve.

SUMMARY OF THE INVENTION

In accordance with the teachings of the present invention, a system and method are disclosed for detecting a road curve as a vehicle approaches the curve, automatically providing road curvature information and controlling vehicle speed. The system uses a locating device, such as a GPS receiver, and a map database to know the vehicle's position relative to curves in the road. Depending on the speed of the vehicle, the system generates a curvature profile for different curvature data points at or around the curve in front of the vehicle. Based on the curvature profile information, the system generates a desired speed profile for the curvature points. The desired speed profile and the actual vehicle speed are compared to determine whether the vehicle is traveling too fast for the target speed at each profile point. If so, the system provides a command to decelerate the vehicle as it navigates around the curve. The acceleration computation can be enhanced by providing a driver cornering mode input that the vehicle operator can select based on how aggressively the driver wants the system to act to slow down the vehicle.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for identifying a curve in the road for a vehicle, and automatically providing braking if the vehicle is traveling too fast for the curve, is merely exemplary in nature, and is in no way intended to limit the invention or its applications or uses.

The present invention proposes a curve speed control system for a vehicle that automatically provides a braking command to vehicle brakes if the system is activated and the vehicle is approaching a curve too quickly. As will be discussed in detail below, the curve speed control system adaptively provides road curve information at certain intervals from the vehicle depending on the vehicle speed. Further, the present invention includes a driver cornering mode that allows the vehicle operator to selectively control the aggressiveness that the curve speed control system will allow the vehicle to travel through the curve.

Figure 1:
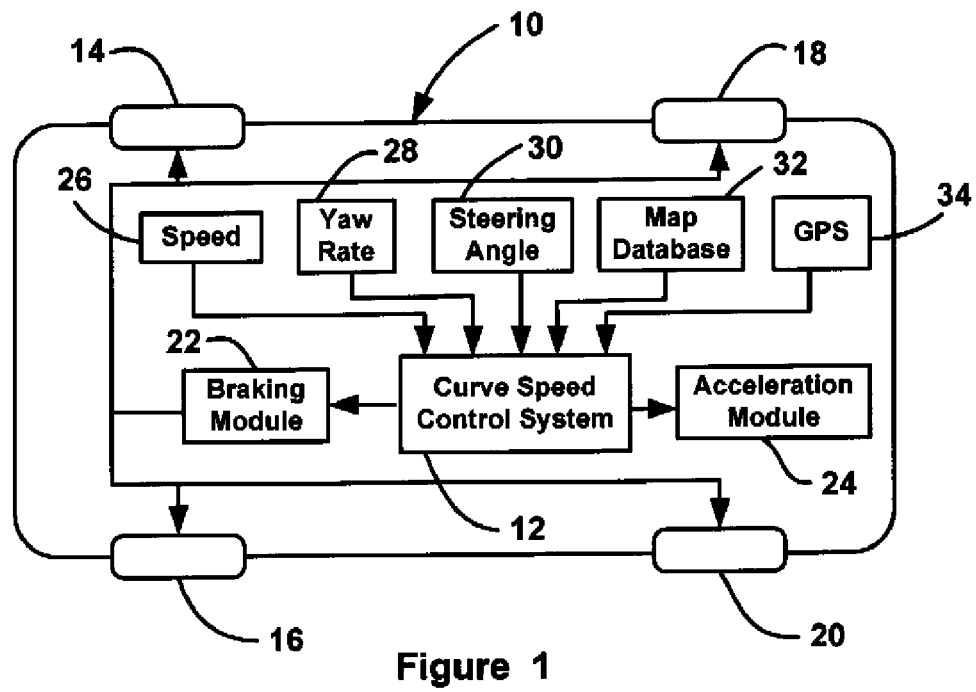
FIG. 1 is a plan view of vehicle including a curve speed control system, according to an embodiment of the present invention.

FIG. 1 is a block diagram plan view of a vehicle 10 including a curve speed control system 12; according to an embodiment of the present invention. The vehicle 10 includes front wheels 14 and 16 and rear wheels 18 and 20. The curve speed control system 12 can provide automatic braking to the wheels 14-20 through a braking control module 22 if the system 12 is enabled and the vehicle 10 is traveling toward or around a curve too quickly. Further the curve speed control system 12 can provide vehicle acceleration by an acceleration control module 24 if the system 12 is part of a vehicle speed control system, such as an adaptive cruise control (ACC) system, well known to those skilled in the art.

The curve speed control system 12 receives various vehicle parameter inputs, such as vehicle speed signals from a vehicle speed sensor 26, yaw rate signals from a yaw rate sensor 28, vehicle steering angle signals from a steering angle sensor 30, map information from a map database 32, and GPS position signals from a GPS receiver 34. The GPS receiver 34 may be replaced or augmented with any suitable locator system that provides the geographic location of the vehicle 10. The map database 32 will include the necessary information required by the system 12, and may include information about road curvature, curve bank angle, road surface co-efficient of friction, road surface material, etc. The map database 32 can be any suitable device that provides information about road curves, and can be updated by satellite or cellular transmissions or be a storage device on the vehicle 10. Further, other data can also be provided, such as ambient temperature, weather, etc.

Figure 2:
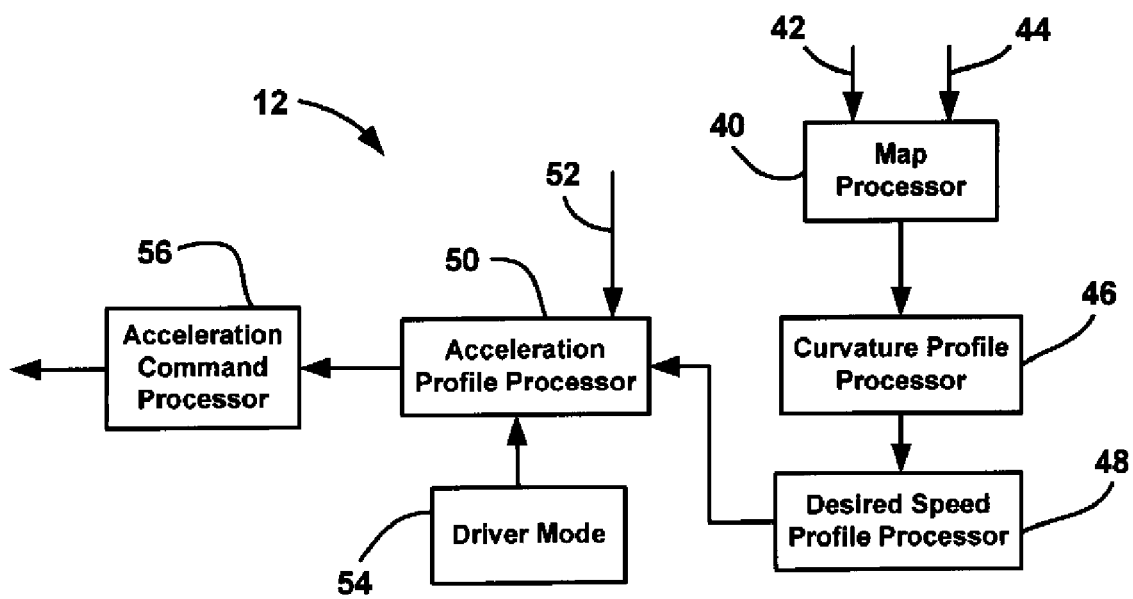
FIG. 2 is a schematic block diagram of the curve speed control system shown in FIG. 1

FIG. 2 is a block diagram of the curve speed control system 12 that provides acceleration and deceleration commands to the brake control module 22 and the acceleration control module 24. A map processor 40 is used in association with the map database 32, and can be any suitable processor for the purposes described herein.

Figure 3:
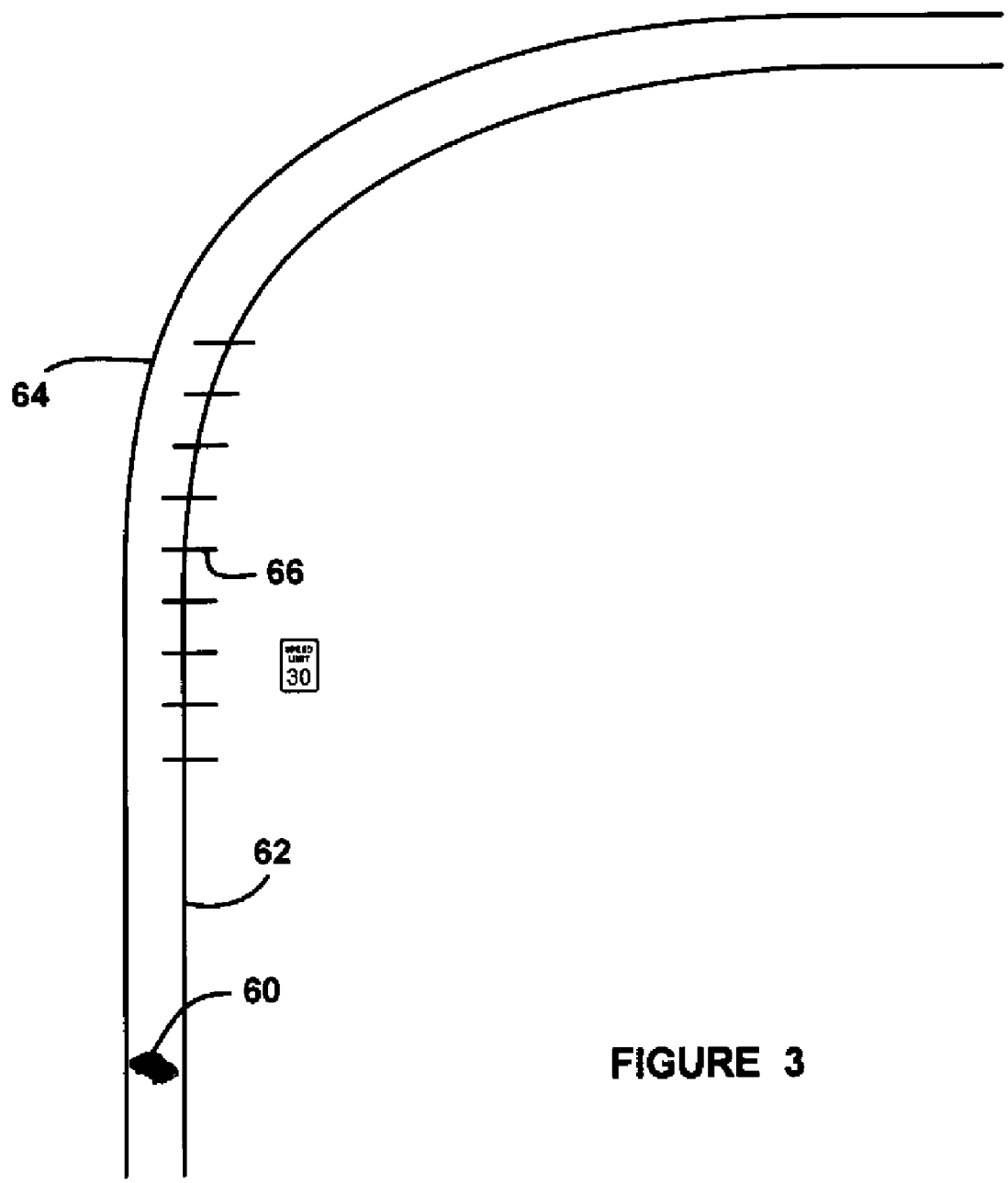
FIG. 3 is a plan view of a series of curvature data points around a portion of a curve in the road that identify locations to provide a road curve profile.

The map processor 40 receives the sensor signals from the various vehicle sensors discussed above on line 42 and the GPS signals from the GPS receiver 34 that provides the location of the vehicle 10 on line 44. The map processor 40 identifies a number of curvature data points based on the vehicle speed, where each data point is defined by a gap $d_{gap}=d(V_x)$. FIG. 3 shows a plan view of a vehicle 60 traveling along a road 62 and approaching a curve 64 in the road 62. A series of curvature data points 66 identify those locations along the road 62 for which the system 12 provides curvature information. The distance between the vehicle 60 and the data points 66 and the distance between the data points 66 are adaptively determined by the system 12 based on the vehicle speed $V_x$ using the gap calculation. Further, as will discussed in detail below, the number of the data points 66 can be set based on driver desired aggressiveness. The curvature of the curve 64 may be computed as a reciprocal of the radius of a circle fitted for the neighboring three data points of the curve. For simulated road geometry, the road geometry data is computed offline using a cubic B-spline fitted to the whole path and stored with the curvature data in a table format so that it can be referenced using the vehicle position.

A curvature profile processor 46 receives and stores the curvature path geometry and curvature data information at every predetermined period of time, such as 100 ms, for the curvature data points 66 from the map processor 40. The curvature profile processor 46 generates a curvature profile of an upcoming curve in the road based on the data points 66 that is adaptable to the vehicle speed signal $V_x$. The road curvature estimation or profile can be defined by the curvature data points 66 along the curve as:

$$c_{target} = [c(0), c(1), \ldots, c(N)] \quad (1)$$

In one non-limiting embodiment, the control loop is set at 10 ms so that the vehicle speed, yaw rate and steering wheel angle are utilized to interpolate the vehicle position. When there is no current map data available, the processor 46 will interpolate the stored path geometry data based on the current vehicle position and the estimate of the curvature of the upcoming road.

The road curvature profile is then sent to a desired speed profile processor 48 that generates a desired or target vehicle speed profile that provides a target speed for each curvature data point 66 by referring to a target speed look-up table computed offline for a given curvature or road radius. The target speed profile is modified based on vehicle characteristics, driver preference or other road information such as, bank angle, road gradient and other conditions.

The vertical and the radial force equilibrium equations for a vehicle to slip out of a curve with a bank angle θ and a road friction coefficient μ can be defined as:

$$mg - N\cos\theta + \mu N\sin\theta = 0 \quad (2)$$

$$\frac{mV_x^2}{R} - N\sin\theta + \mu N\cos\theta = 0 \quad (3)$$

Where m is the vehicle mass, R is the radius of curvature of the curve and g is the acceleration constant.

The critical speed $V_{x\_critical}$ that would cause a vehicle to slide out of a curve can be provided from equations (2) and (3) as:

$$V_{x\_critical} = \sqrt{\frac{A_y(\sin\theta + \mu\cos\theta)}{\cos\theta - \mu\sin\theta}} \quad (4)$$

Where $A_y = Rg$.

Although lateral dynamics of a vehicle is a primary factor in deciding the desired curve speed, there are many other defining factors, such as driver comfort level, posted curve speed limit, road condition, bank angle, vehicle characteristics and driver style that affect the desired vehicle speed. If the maximum lateral acceleration is limited to $A_y$ for driver comfort, then equation (4) can be written for a desired comfort speed $\hat{V}_{x(i)}$ as:

$$\hat{V}_{x(i)} = K_v K_d K_r \sqrt{\frac{A_y(\sin\theta + \mu\cos\theta)}{\cos\theta - \mu\sin\theta}} \quad (5)$$

Where $K_v$ is a factor associated with vehicle characteristics, $K_d$ is a factor relating to driving style and $K_r$ is a factor associated with road type. The factor $K_v$ is a constant gain factor related to the vehicle's center of gravity height, track width, vehicle roll characteristics, etc. The factor $K_d$ is a gain factor that could be selected dynamically by the driver, such as driving mode selection as normal, conservative or aggressive. The factor $K_r$ is based on updated road conditions, such as highway, local street, gravel road, etc., which can be included in the map data.

Solving equation (5) for each curvature data point i, the vehicle target speed profile $\hat{V}_{x\_target}$ can be provided as:

$$\hat{V}_{x\_target} = [\hat{V}_x(0), \hat{V}_x(1), \ldots, \hat{V}_x(N)] \quad (6)$$

The desired target speed profile $\hat{V}_{x\_target}$ and the actual vehicle speed $V_x$ on line 52 are sent to an acceleration profile processor 50 to generate an acceleration command $A_{x\_cmd}$ based on the current vehicle speed $V_x$ and the desired speed profile $\hat{V}_{x\_target}$ for a curve ahead of the vehicle 10. In one non-limiting embodiment, the acceleration command $A_{x\_cmd}$ can be computed by minimizing the sum of the speed differences between the future vehicle speed and the target speed using an optimal control principle. The future vehicle speed can be computed for each data point 66 from equation (7) below if a constant acceleration command $A_x$ is applied.

$$V_x(i) = V_x(0) + A_x \times \Delta t \times i \quad (7)$$

Further, a weighting function W can be applied to each curvature data point 66 depending on its distance from the vehicle 10 as:

$$W = [w(o), w(1), \ldots, w(N)] \quad (8)$$

Typically, the points closer to the vehicle 10 will be weighted higher. The weighting function W makes the speed transition through the curve smooth.

The acceleration profile processor 50 also receives a driver cornering mode signal from a driver mode processor 54 that identifies how aggressive the driver wants the vehicle 10 to respond to driving through a curve. For example, an aggressive driver may want to set the speed through the curve higher than what would be a normal comfort level for most drivers, or may want the vehicle to not react as quickly to an upcoming curve. In order to accommodate the driver mode, the algorithm used by the control system 12 sets a minimum index value $K_1$ and a maximum index value $K_2$ depending on the mode selected as:

$$K_1 = K_{min}(\text{Mode}_{csc\_sw}) \quad (9)$$

$$K_2 = K_{max}(\text{Mode}_{csc\_sw}) \quad (10)$$

The values $K_1$ and $K_2$ define the number of the data points 66 that will be used to compute the speed profile locations on the curve. Table I below gives one non-limiting example of a mode switch setting for an aggressive driver at 0 and a conservative driver at 3 where the value $K_1$ is set at 3 for of the driver modes, and the value $K_2$ is set differently for each driver mode where the difference between $K_1$ and $K_2$ is the number of the data points that are used. The fewer the number of the data points 66, the quicker the variations in speed change will happen to the vehicle 10. In other words, the fewer the number of the points 66 that are looked at along the curve, the sharper the deceleration will be from one point to the next point.

TABLE I

| Mode Switch Setting | Preview Time Lower Bound $K_1$ (Sec) | Preview Time Upper Bound $K_2$ (Sec) |
|---|---|---|
| 0 | 3.0 | 6.0 |
| 1 | 3.0 | 7.0 |
| 2 | 3.0 | 8.0 |
| 3 | 3.0 | 9.0 |

The processor 50 defines a performance index function as a sum of squares of the squared vehicle speed difference as:

$$J = \sum_{i=K_1}^{K_2} \left\{ \hat{V}_x(i)^2 - V_x(i)^2 \right\}^2 w(i) \quad (11)$$

$$= \sum_{i=K_1}^{K_2} \left\{ \hat{V}_x(i)^2 - V_x(0)^2 - 2A_x \times d(V_x) \times i \right\}^2 w(i)$$

In order to compute the optimal acceleration command, equation (11) is differentiated with respect to the acceleration command $A_x$, where $\partial J/\partial A_x = 0$.

An acceleration command processor 56 generates the acceleration command $A_x$ as:

$$A_x = \frac{\sum_{i=K_1}^{K_2} \left\{ \hat{V}_x(i)^2 - V_x(0)^2 \right\} \times w(i) \times i}{2d(V_x) \times \sum_{i=K_1}^{K_2} w(i) \times i^2}$$

The acceleration command $A_{x\_cmd}$ is applied to the braking module 22 and/or the acceleration module 24 to automatically control the speed of the vehicle 10 as it traveling around the curve.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A curve speed control system for controlling the speed of a vehicle traveling on a curve, said system comprising:
    a map database storing information about road curves that the vehicle may be traveling through, said map database including a map database processor that includes curvature information about the curves;
    a curvature profile processor responsive to the curvature information from the map processor and providing a curvature profile as a series of curvature data points from the curvature information of the curve, said curvature profile processor determining when to provide the curvature profile based on the vehicle speed;
    a desired speed profile processor responsive to the curvature profile from the curvature profile processor, said desired speed profile processor providing a desired speed for each curvature profile point and providing a desired speed profile;
    a driver mode selector that provides a driver mode value based on driver aggressiveness;
    an acceleration profile processor that receives the desired speed profile from the desired speed profile processor, a vehicle speed signal and the driver mode value, said acceleration profile processor providing a performance index function based on the difference between the vehicle speed, the desired speed and the driver mode value; and
    an acceleration command processor for providing an acceleration command that controls the speed of the vehicle based on the performance index function.

2. The system according to claim 1 wherein the curvature profile processor determines when to provide the curvature profile by a gap defined as the distance between the curvature data points as a derivative of the vehicle speed.

3. The system according to claim 1 wherein the driver mode value determines the number of the curvature data points that are used to calculate differences between the vehicle speed and the desired speed to provide the performance index function.

4. The system according to claim 3 wherein the performance index function is defined by the equation:

$$J = \sum_{i=K_1}^{K_2} \{\hat{V}_x(i)^2 - V_x(i)^2\}^2 w(i)$$

$$= \sum_{i=K_1}^{K_2} \{\hat{V}_x(i)^2 - V_x(0)^2 - 2A_x \times d(V_x) \times i\}^2 w(i)$$

where J is the performance index function, $K_1$ and $K_2$ are a minimum index value and a maximum index value, respectively, that define the driver mode value, $\hat{V}_x$ is the desired speed, $A_x$ is the acceleration command, $V_x$ is the vehicle speed and w is a weighting function.

5. The system according to claim 4 wherein the acceleration command processor calculates the acceleration command as:

$$A_x = \frac{\sum_{i=K_1}^{K_2} \{\hat{V}_x(i)^2 - V_x(0)^2\} \times w(i) \times i}{2d(V_x) \times \sum_{i=K_1}^{K_2} w(i) \times i^2}.$$

6. The system according to claim 1 wherein the acceleration profile processor generates the performance index function using an optimal control principle that minimizes the sum of the speed differences between the vehicle speed and the desired speed.

7. The system according to claim 1 further comprising a GPS receiver providing a vehicle location signal to the map database processor.

8. The system according to claim 1 further comprising a vehicle speed sensor providing a vehicle speed signal, a yaw rate sensor providing a vehicle yaw rate signal and a steering angle sensor providing a vehicle steering angle signal, wherein the vehicle speed signal, the yaw rate signal and the steering angle signal are provided to the map processor to identify the curvature information.

9. The system according to claim 1 further comprising a braking module and an acceleration module, said acceleration command being provided to the braking module and/or the acceleration module so as to provide vehicle braking control or acceleration control depending on the value of the command.

10. The system according to claim 1 wherein a weighting function is applied to each data point in the acceleration profile processor.

11. The system according to claim 1 wherein the desired speed profile processor determines the desired speed for each data point based on driver comfort.

12. The system according to claim 11 wherein the desired speed for each data point is determined by the equation:

$$\hat{V}_{x(i)} = K_v K_d K_r \sqrt{\frac{A_y(\sin\theta + \mu\cos\theta)}{\cos\theta - \mu\sin\theta}}$$

where $\hat{V}_x$ is the desired speed for each data point, $K_v$ is a gain factor related to the vehicle center of gravity, track width and roll characteristics, $K_d$ is a gain factor that is based on driver aggressiveness, $K_r$ is a factor based on road conditions, $A_y$ is vehicle lateral acceleration, $\mu$ is road surface coefficient of friction and $\theta$ is curve bank angle.

13. A curve speed control system for controlling the speed of a vehicle traveling on a curve, said system comprising:
a map database storing information about road curves that the vehicle may be traveling through, said map database including a map database processor that includes curvature information about the curves;
a locator device providing a vehicle location signal to the map database processor;
a curvature profile processor responsive to the curvature information from the map processor and providing a curvature profile as a series of curvature data points from the curvature information of the curve;
a desired speed profile processor responsive to the curvature profile from the curvature profile processor, said desired speed profile processor providing a desired speed for each curvature profile point and providing a desired speed profile;
a driver mode selector that provides a driver mode value based on driver aggressiveness;
an acceleration profile processor that receives the desired speed profile from the desired speed profile processor, a vehicle speed signal and the driver mode value, said acceleration profile processor providing a performance index function based on the difference between the vehicle speed, the desired speed and the driver mode value; and
an acceleration command processor for providing an acceleration command that controls the speed of the vehicle based on the performance index function.

14. The system according to claim 13 wherein the driver mode value determines the number of the curvature data points that are used to calculate differences between the vehicle speed and the desired speed to provide the performance index function.

15. The system according to claim 14 wherein the performance index function is defined by the equation:

$$J = \sum_{i=K_1}^{K_2} \{\hat{V}_x(i)^2 - V_x(i)^2\}^2 w(i)$$

$$= \sum_{i=K_1}^{K_2} \{\hat{V}_x(i)^2 - V_x(0)^2 - 2A_x \times d(V_x) \times i\}^2 w(i)$$

where J is the performance index function, $K_1$ and $K_2$ are a minimum index value and a maximum index value, respectively, that define the driver mode value, $\hat{V}_x$ is the desired speed, $A_x$ is the acceleration command, $V_x$ is the vehicle speed and w is a weighting function.

16. The system according to claim 15 wherein the acceleration command processor calculates the acceleration command as:

$$A_x = \frac{\sum_{i=K_1}^{K_2} \{\hat{V}_x(i)^2 - V_x(0)^2\} \times w(i) \times i}{2d(V_x) \times \sum_{i=K_1}^{K_2} w(i) \times i^2}.$$

17. The system according to claim 13 wherein the acceleration profile processor generates the performance index function using an optimal control principle that minimizes the sum of the speed differences between the vehicle speed and the desired speed.

18. The system according to claim 13 further comprising a vehicle speed sensor providing a vehicle speed signal, a yaw rate sensor providing a vehicle yaw rate signal and a steering angle sensor providing a vehicle steering angle signal, wherein the vehicle speed signal, the yaw rate signal and the steering angle signal are provided to the map processor to identify the curvature information.

19. The system according to claim 13 further comprising a braking module and an acceleration module, said acceleration command being provided to the braking module and/or the acceleration module so as to provide vehicle braking control or acceleration control depending on the value of the command.

20. The system according to claim 13 wherein a weighting function is applied to each data point in the acceleration profile processor.

21. The system according to claim 13 wherein the desired speed profile processor determines the desired speed for each data point based on driver comfort.

* * * * *